(12) United States Patent
Ganesan et al.

(10) Patent No.: US 12,071,313 B2
(45) Date of Patent: Aug. 27, 2024

(54) VARIABLE DC BUS VOLTAGE IN AN INDEPENDENT CART SYSTEM

(71) Applicant: Rockwell Automation Technologies, Inc., Mayfield Heights, OH (US)

(72) Inventors: Nandini Ganesan, Milwaukee, WI (US); Patrick E. Ozimek, Milwaukee, WI (US); Omid Shirazi, Brown Deer, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 814 days.

(21) Appl. No.: 17/133,844

(22) Filed: Dec. 24, 2020

(65) Prior Publication Data

US 2022/0204284 A1   Jun. 30, 2022

(51) Int. Cl.
*B60L 13/03* (2006.01)
*B60L 9/18* (2006.01)
*B65G 47/64* (2006.01)

(52) U.S. Cl.
CPC ................... *B65G 47/642* (2013.01)

(58) Field of Classification Search
USPC ......................................................... 318/687
See application file for complete search history.

(56) References Cited

U.S. PATENT DOCUMENTS

| | | | |
|---|---|---|---|
| 4,853,602 A * | 8/1989 | Hommes | B60L 15/005 318/135 |
| 10,261,491 B1 * | 4/2019 | Dunham | G05D 1/0016 |
| 10,585,145 B2 | 3/2020 | Shirazi et al. | |
| 10,717,365 B2 | 7/2020 | Huang et al. | |
| 2011/0184601 A1 * | 7/2011 | Shapery | B60L 5/005 191/10 |
| 2012/0226398 A1 * | 9/2012 | Castle | B60M 7/00 191/22 R |
| 2019/0039460 A1 * | 2/2019 | Teramoto | H02P 27/08 |
| 2020/0017308 A1 * | 1/2020 | Huang | B65G 54/02 |
| 2020/0169157 A1 | 5/2020 | Weber | |
| 2020/0171958 A1 * | 6/2020 | Huang | B60L 13/10 |

OTHER PUBLICATIONS

Extended European Search Report dated May 20, 2022; Application No./Patent No. 21213123.9-1012—(9) pages.

* cited by examiner

*Primary Examiner* — Gabriel Agared

(74) *Attorney, Agent, or Firm* — Boyle Fredrickson, S.C.

(57) ABSTRACT

A system and method for varying an amplitude of voltage on a DC bus by track segment in a linear drive system for an independent cart system according to application requirements is disclosed. The track includes at least a first portion and a second portion, where a DC voltage at a first amplitude is provided to the first portion of the track, and a DC voltage at a second amplitude is provided to the second portion of the track. The first amplitude of the DC voltage is selected to permit movers traveling along the track to travel at full rated speed with a full rated three applied to the mover. The second amplitude of the DC voltage is selected to permit the movers to travel at a reduced speed with full or increased three applied or to travel at full rated speed with a reduced force applied to the mover.

13 Claims, 10 Drawing Sheets

VARIABLE DC BUS VOLTAGE IN AN INDEPENDENT CART SYSTEM

BACKGROUND INFORMATION

The subject matter disclosed herein relates to a system and method for providing a variable DC bus voltage in an independent cart system. More specifically, a first portion of a track in the independent cart system may be configured to receive a DC bus voltage at a first amplitude and a second portion of the track may be configured to receive a DC bus voltage at a second amplitude.

Motion control systems utilizing independent carts and linear motors can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled carts, also referred to herein as "movers", each supported on a track for motion along the track. The track is made up of a number of track segments, and a linear drive system controls operation of the movers, causing the movers to travel along the track. Sensors may be spaced at fixed positions along the track and/or on the movers to provide information about the position and speed of the movers.

In a typical system, the track forms a path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then returns to the loading station to receive another unit of the product. It may be desirable to have the mover travel at different speeds along different segments of the track. For example, as the mover travels past the actuators, the mover may be programmed to travel at a slow speed to facilitate interaction with the actuator, and as the mover travels along a return path, the mover may be programmed to travel at a high speed.

Each of the movers may be independently moved and positioned along the track in response to an electromagnetic field generated by the linear drive system. A linear drive system is often considered analogous to a rotary drive system (i.e., a motor) in which the stator of the motor is unrolled onto a surface and the rotor moves along the surface. The stationary portion of the linear drive system includes a number of coils spaced out along the surface on which the linear drive system is intended to operate. In the independent cart system, this stationary portion of the linear drive system is the track. In a rotary motor, the rotor spins in response to an electromagnetic field generated within the stator. In the linear drive system, each mover includes a drive member which interacts with an electromagnetic field generated by the coils. A controller selectively applies voltage to the coils along the track which, in turn, creates an electromagnetic field that moves along the length of the track responsive to the voltage being applied to the coils. The drive member on each mover may include, for example, a set of permanent magnets, where the magnetic field of the permanent magnets follows the electromagnetic field moving along the track and, in turn, propels the mover along the track.

The voltage applied to the coils is generated by one or more power segments spaced out along the length of the track. Each power segment may supply a voltage to one or more coils. The power segment receives a DC voltage as an input. The power segment includes power switching devices, such as power transistors, that selectively connect the DC voltage to the coil in a manner that approximates an AC voltage. Modulation techniques such as Pulse Width Modulation or Space Vector Modulation developed for rotary machines and applied in linear drive systems as well are used to control the power switching devices to convert the DC voltage to a desired AC voltage. The DC voltage is present on a DC bus and, for a linear drive system, the DC bus is connected in series between each of the multiple power segments to supply the DC voltage along the length of the track.

Supplying a constant DC voltage along the track is not without certain drawbacks. Each power segment receives the same DC voltage. On certain segments of the track mover performance may not require as high a DC voltage as on other segments of the track. However, with modulation, certain undesirable effects, such as switching losses and radiated emissions are a function of the DC voltage. As a result, these switching losses and radiated emissions are greater than desired.

Thus, it would be desirable to provide a system in which the amplitude of the DC voltage present on the DC, bus in a linear drive system may vary by track segment according to application requirements.

BRIEF DESCRIPTION

According to one embodiment of the present invention, an independent cart system includes a track and at least one mover. The track has multiple track segments, where each track segment includes multiple drive coils and at least one power segment. Each drive coil is configured to generate an electromagnetic field responsive to an AC voltage applied to the drive coil, and each power segment is configured to receive a DC voltage as an input and to convert the DC voltage to the AC voltage applied to each of the plurality of drive coils. Each mover is configured to travel along the track and includes a drive member configured to interact with the electromagnetic fields generated by each of the drive coils to propel the mover along the track. The DC voltage present on a first portion of the track segments has a first amplitude, and the DC voltage present on a second portion of the track segments has a second amplitude, where the second amplitude is different than the first amplitude.

According to another embodiment of the invention, a method for controlling operation of at least one mover in an independent cart system is disclosed. A first DC voltage is received along a first portion of a track for the independent cart system, and a second DC voltage is received along a second portion of the track. The track includes multiple track segments and an amplitude of the second DC voltage is different than an amplitude of the first DC voltage. The first DC voltage is converted to a first AC voltage along the first portion of the track with at least one power segment present on each track segment, and the second DC voltage is converted to a second AC voltage along the second portion of the track with at least one power segment present on each track segment. Each mover is propelled along the first and second portions of the track via a drive member mounted on the mover. The drive member is configured to interact with an electromagnetic filed generated by the first AC voltage and with an electromagnetic field generated by the second AC voltage.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
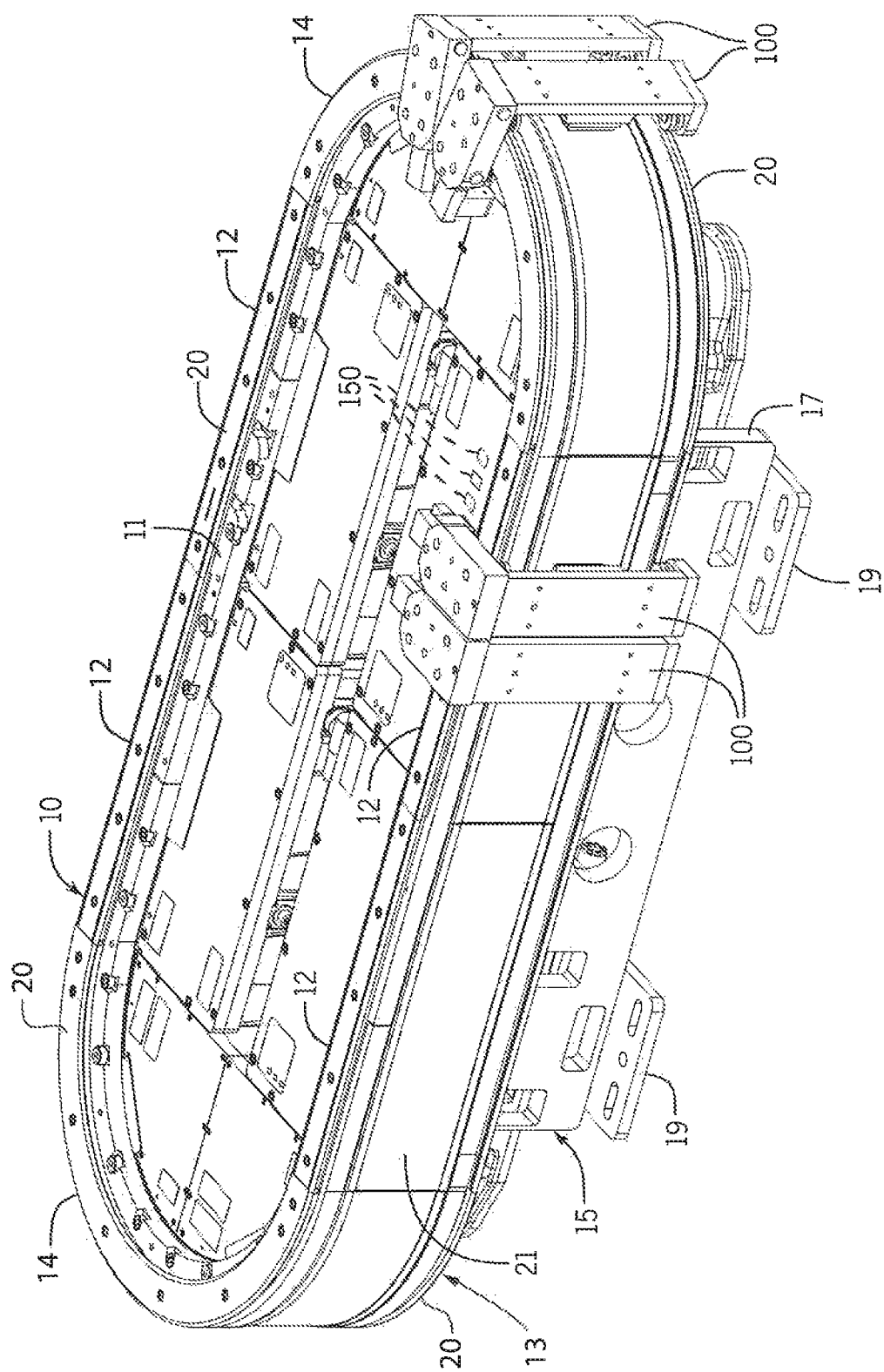
FIG. 1 is an isometric view of an exemplary linear cart system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system in which the amplitude of the DC voltage present on the DC bus in a linear drive system may vary by track segment according to application requirements in a first segment of the track, the application may require each mover to travel at a high speed, and in a second segment of the track, the application may require each mover to travel at a low speed. The first segment of the track may be, for example, a return path between an unload station and a load station, during which the mover has no load. The second segment of the track may be, for example, a processing path where the mover receives a new container at the load station, receives product within the container at a first station, receives a label on the container at a second station, passes a third station which seals the container, and delivers the packaged product to an unload station. Although discussed with respect to particular stations, it is contemplated that one or more interactions with the mover along the second segment of the track may occur as the mover continues moving along the track. Additionally, the example application, presented above and referenced herein, is intended to be exemplary and not limiting. It is contemplated that numerous configurations and arrangements of stations and tracks may be utilized without deviating from the scope of the present invention.

The voltage present on the DC bus is used by the power segment of each controller to deliver a desired AC voltage to the coils spaced along the track. If the amplitude of the DC voltage is reduced, then the peak AC voltage supplied to the coils is similarly reduced. The AC voltage supplied to the coils must be sufficient to both generate a desired torque in the mover and to overcome the back-end induced in the coils as a result of a mover being driven along the track. As the speed of the mover increases, the magnitude of the back-end similarly increases. Without the peak AC voltage available, either the speed of the mover along the track or the amount of torque available would be limited. Consequently, the voltage on the DC bus has typically been a constant voltage along the length of the track and capable of providing full rated AC voltage for the linear drive system such that full rated torque at full speed may be provided to a mover at any location along the track.

Modulation of the DC bus voltage to generate the desired AC voltage can, however, produce some undesirable side effects. One undesirable effect of modulation in a power segment is a switching loss. While an ideal switching device would operate at one hundred percent efficiency, practical switching devices have some inherent internal resistance and capacitance. Applying a voltage across the device results in some power being dissipated within the device. The amplitude of the switching losses is proportional to the magnitude of the DC bus voltage and a reduced DC bus voltage, therefore, results in reduced switching losses. Another undesirable effect of modulation in a power segment is conducted and/or radiated emissions. As a power segment approximates an AC voltage during modulation, the switching devices rapidly transitions between full DC bus voltage and zero voltage. The average voltage during each switching period provides a desired amplitude of the AC voltage during each switching period. By increasing and decreasing the duty cycle of modulation, the amplitude of the AC voltage increases and decrease over the fundamental cycle for the AC voltage. However, the switching devices are applying a voltage waveform transitioning between fill voltage and zero voltage during each switching period. This rapid transition between full voltage and zero voltage creates rapid changes in voltage with respect to time (i.e., dv/dt)

which, in turn, can cause conducted and/or radiated emissions at the switching frequency or multiples (i.e., harmonics) thereof. The amplitude of these conducted and radiated emissions is proportional to the amplitude of voltage present on the DC bus.

In order to reduce the amplitude of the undesirable side effects resulting from modulation, the amplitude of the voltage present on the DC bus may be reduced. As previously mentioned, however, a reduced DC bus voltage may negatively impact available performance of the mover. In the above described application, the second segment of the track does not require full speed. Rather, the second segment of the track is configured to have the movers travel at a reduced speed. When the movers are traveling at the reduced speed, the peak amplitude of the AC voltage supplied to the coils can be reduced and still provide full rated torque on the mover at the reduced speed. Consequently, the DC bus voltage may be reduced and still have sufficient amplitude for the power segment to generate the required AC voltage to provide desired operation of the movers at reduced speed along the second segment of the track.

In order to provide different amplitudes of DC voltage, multiple power supplies may be provided. A first DC power supply may be configured to supply a DC voltage at a first amplitude, and a second DC power supply may be configured to supply a DC voltage at a second amplitude. Rather than connecting all segments of the track in series to a single power supply, the first DC power supply may supply the DC voltage at the first amplitude to the first portion of the track, and the second DC power supply may supply the DC voltage at the second amplitude to the second portion of the track. Each track segment within the first portion of the track may be connected in series with the first DC bus voltage passed between segments, and each track segment within the second portion of the track may be connected in series with the second DC bus voltage passed between segments. The amplitude of the DC bus voltage on the second segment may be set less than the amplitude of the DC bus voltage on the first segment such that the switching losses, as well as the conducted and/or radiated emissions in the second segment are reduced.

Figure 2:
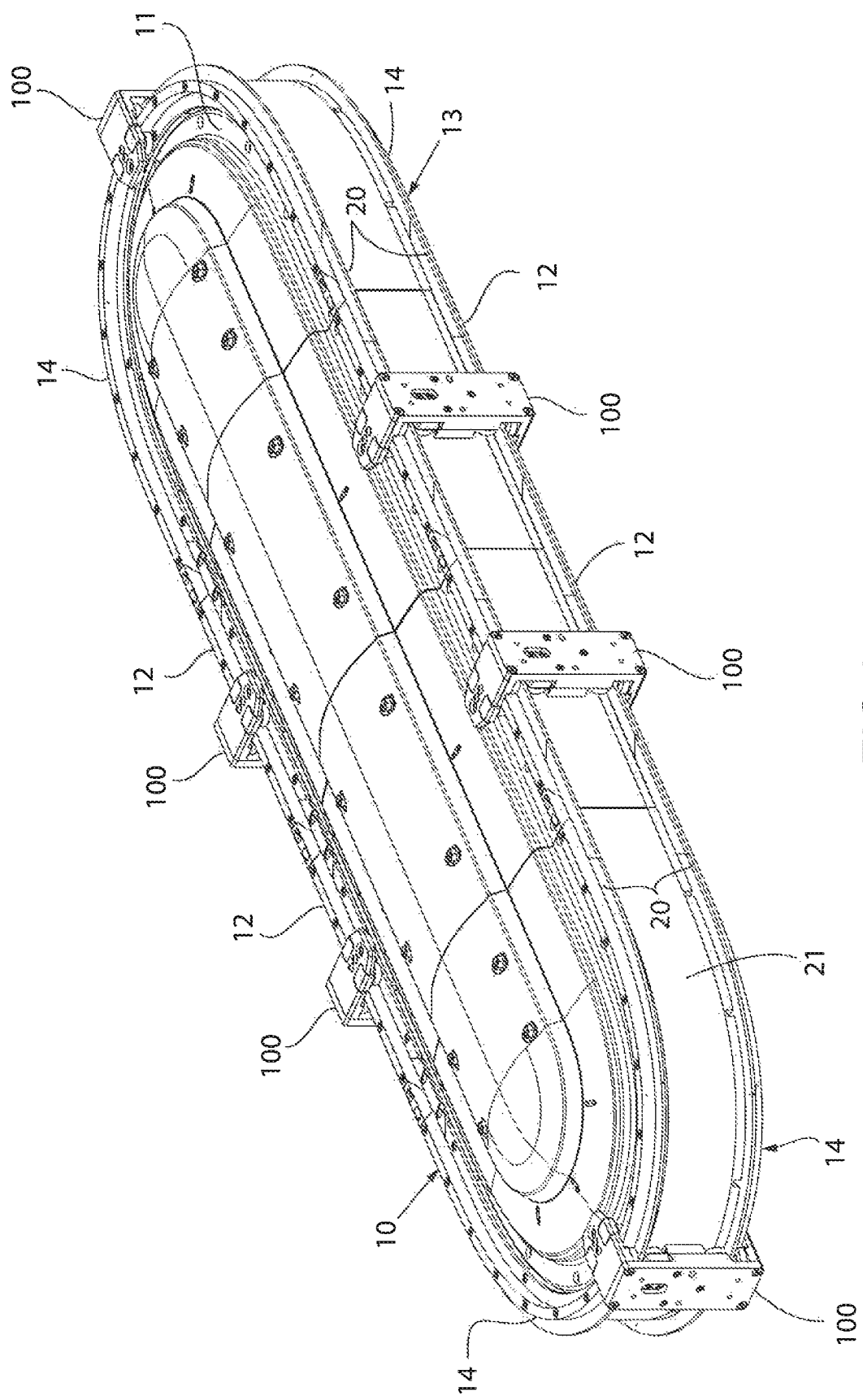
FIG. 2 is an isometric view of an exemplary linear cart system incorporating multiple movers travelling along a closed curvilinear track according to another embodiment of the present invention.
Figure 3:
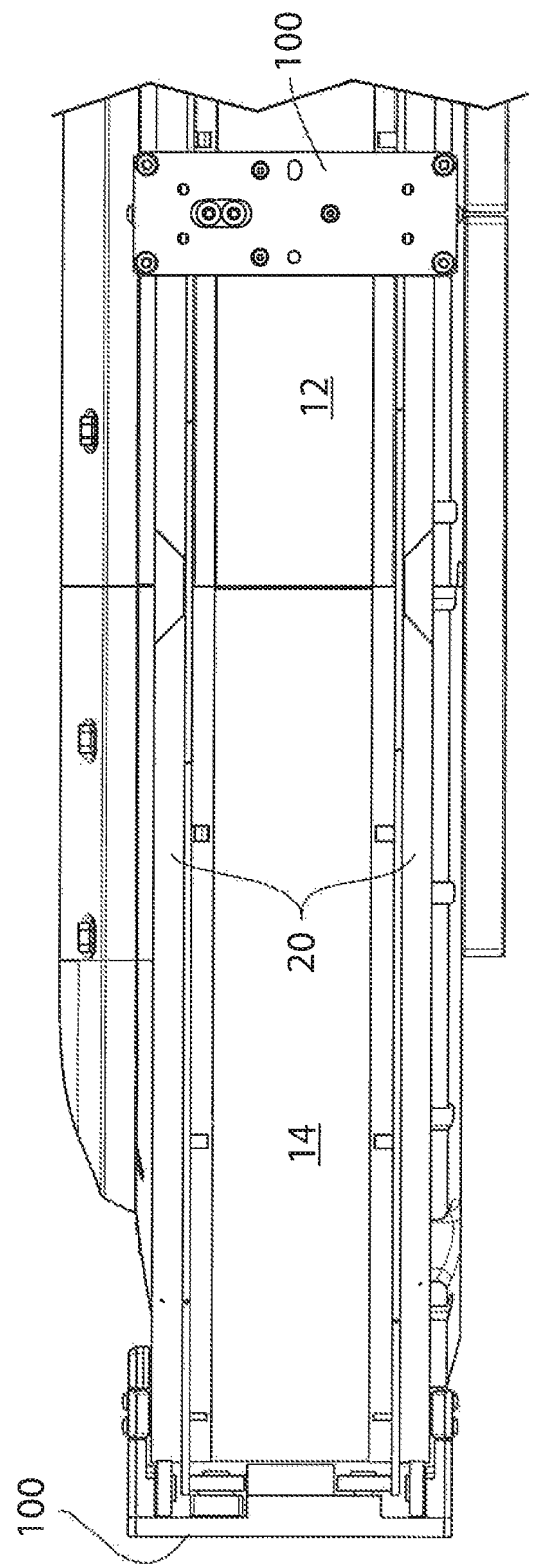
FIG. 3 is a partial side elevation of the linear cart system of FIG. 2.
Figure 4:
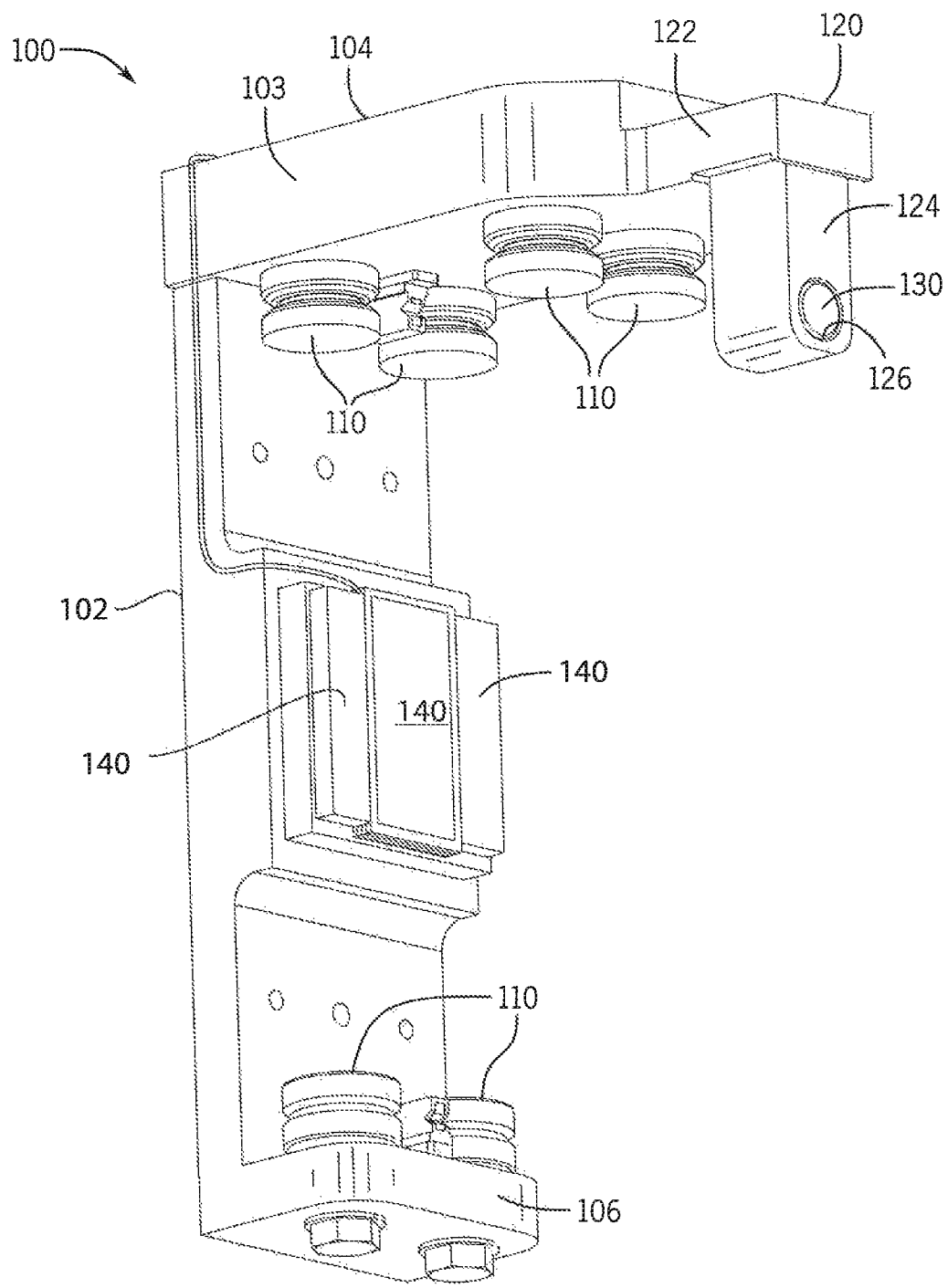
FIG. 4 is an isometric view of a mover from the transport system of FIG. 1.

Turning initially to FIGS. 1-3, two embodiments of an exemplary transport system for moving articles or products are illustrated. The transport system includes a track 10 made up of multiple segments 12, 14. According to the illustrated embodiments, the segments define a generally closed loop supporting a set of movers 100 movable along the track 10. The illustrated tracks 10 each include four straight segments 12 with two straight segments 12 located along each side of the track and spaced apart from the other pair. The tracks 10 also include four curved segments 14 where a pair of curved segments 14 is located at each end of the track 10 to connect the pairs of straight segments 12. The four straight segments 12 and the four curved segments 14 form a generally oval track and define a closed path over which each of the movers 100 may travel. It is understood that track segments of various sizes, lengths, and shapes may be connected together to form a track 10 without deviating from the scope of the invention.

In FIG. 1, the track 10 is oriented in a horizontal plane and supported above the ground by a base 15 extending vertically downward from the track 10. The base 15 includes a pair of generally planar support plates 17, located on opposite sides of the track 10, with mounting feet 19 on each support plate 17 to secure the track 10 to a surface. In FIG. 2, the track 10 is shown without a base. It is contemplated that the tracks 10 may be installed in different orientations, such as sloped or vertical, and include different shaped segments including, but not limited to, straight segments, inward bends, outward bends, up slopes, down slopes and various combinations thereof. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. The movers 100 will travel along the track and take various orientations according to the configuration of the track 10 and the relationships discussed herein may vary accordingly.

Each track segment 12, 14 includes a number of independently attached rails 20 on which each mover 100 runs. According to the illustrated embodiments, rails 20 extend generally along the outer periphery of the track 10. A first rail 20 extends along an upper surface 11 of each segment and a second rail 20 extends along a lower surface 13 of each segment. It is contemplated that each rail 20 may be a singular, molded or extruded member or formed from multiple members. It is also contemplated that the cross section of the rails 20 may be circular, square, rectangular, or any other desired cross-sectional shape without deviating from the scope of the invention. The rails 20 generally conform to the curvature of the track 10 thus extending in a straight path along the straight track segments 12 and in a curved path along the curved track segments 14. The rails 20 may be thin with respect to the dimensions of the track 10 and span only a partial width of the surface of the track 10 on which it is attached.

Figure 5:
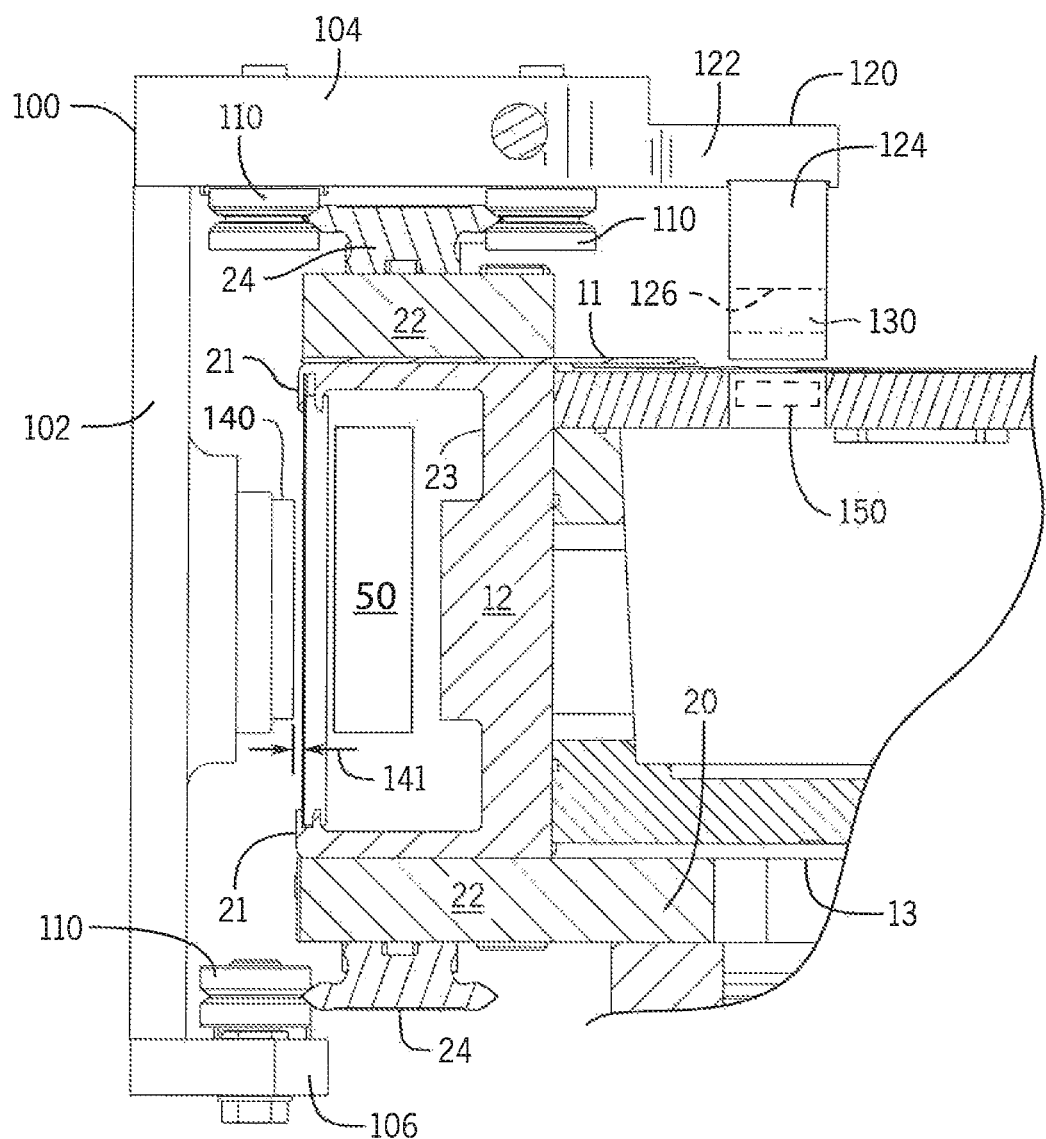
FIG. 5 is a partial sectional view of the transport system of FIG. 1.
Figure 6:
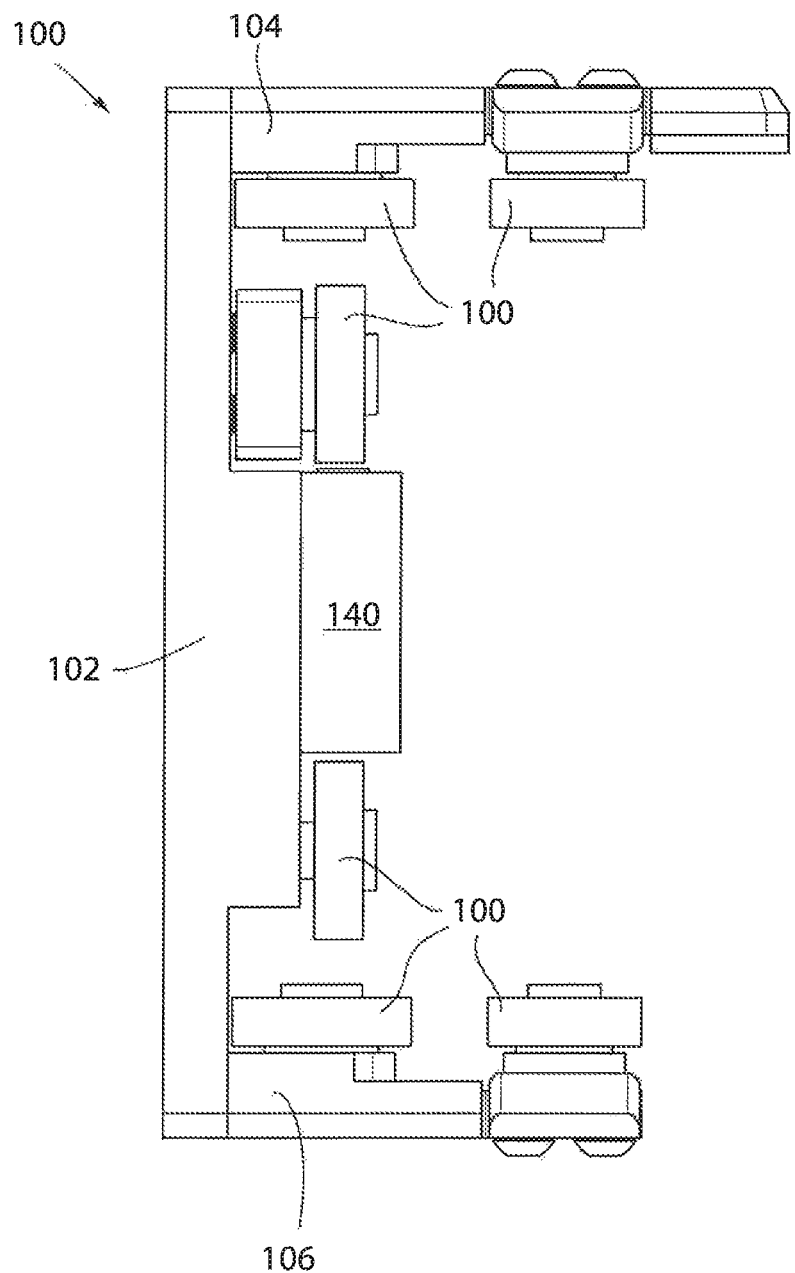
FIG. 6 is a side elevational view of a mover from the transport system of FIG. 2.

With reference also to FIG. 5, a first embodiment of the rail 20 includes a base portion 22 mounted to the track segment and a track portion 24 along which the mover 100 runs. Each mover 100 includes complementary rollers 110 to engage the track portion 24 of the rail 20 for movement along the track 10. Each side of the track portion 24 is wedge-shaped and each roller 110 includes a complementary groove configured to receive the wedge-shaped side of the track portion.

Figure 7:
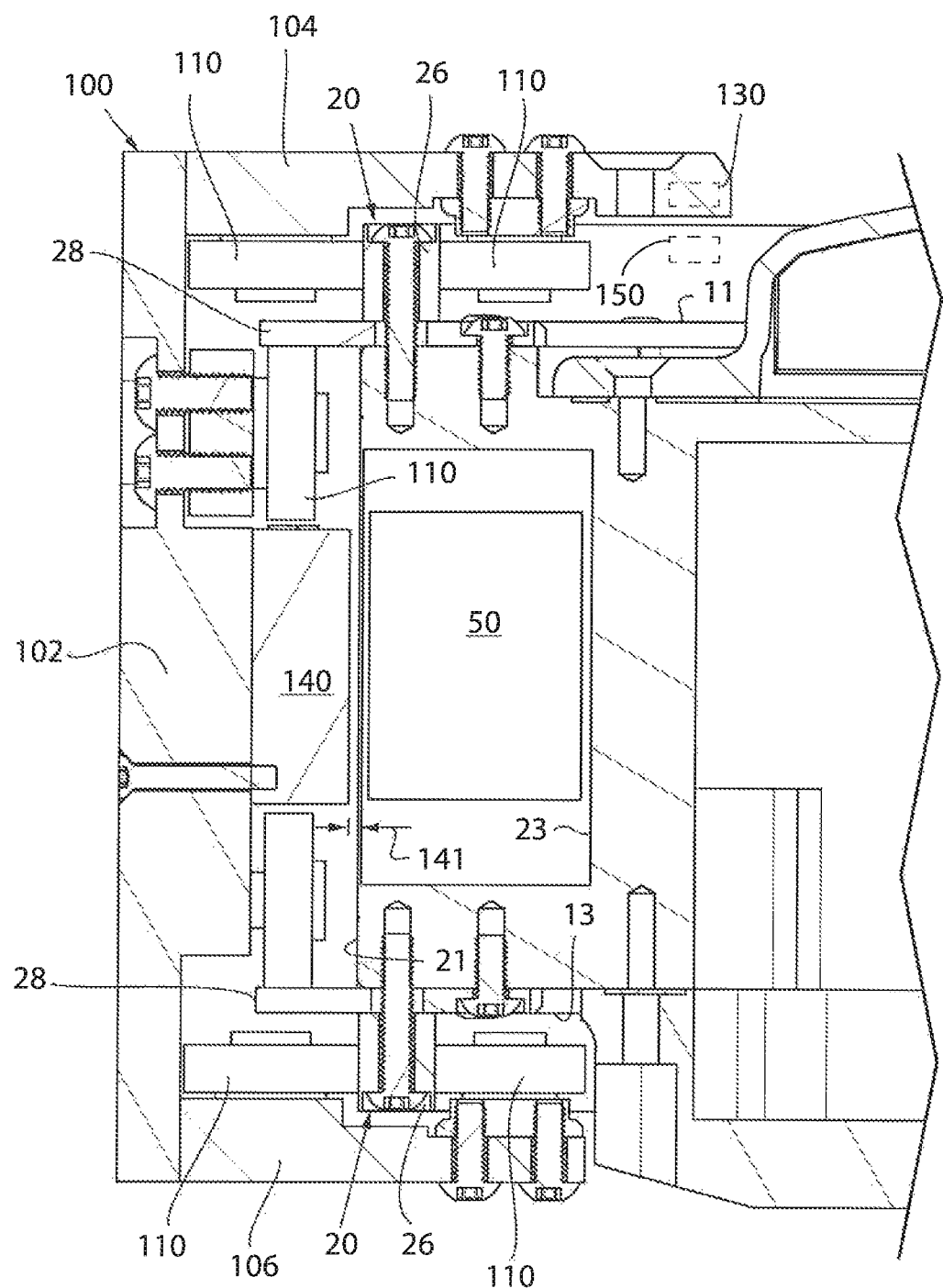
FIG. 7 is a partial sectional view of the transport system of FIG. 2.

With reference also to FIG. 7, a second embodiment of the rail 20 includes two track portions 26, 28, where a first track portion 26 is generally u-shaped and a second track portion 28 is generally rectangular. The first track portion 26 of the upper rail 20 is positioned as an inverted "u" on the top surface 11 of the track and first and second rollers 110 engage each side of the first track portion 26 of the upper rail. The second track portion 28 of the upper rail 20 protrudes from the side of the track segment orthogonally to the orientation of the first track portion 26. A third roller 110 engages one surface of the second track portion 28 of the upper rail. The first track portion 26 of a lower rail 20 is oriented as a non-inverted "u" on the lower surface 13 of the track and fourth and fifth rollers 110 engage each side of the first track portion 26 of the lower rail. The second track portion 28 of the lower rail 20 protrudes from the side of the track segment orthogonally to the orientation of the first track portion 26, and a sixth roller 110 engages one surface of the second track portion 28 of the lower rail.

One or more movers 100 are mounted to and movable along the rails 20 on the track 10. With reference again to FIG. 5, a first embodiment of an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. The top member 104 includes a first segment 103, extending orthogonally from the side member 102 for the width of the rail 20, which is generally the same width as the side member 102. A set of rollers 110 are mounted on the lower side of the first segment 103 and are configured to engage the track portion 24 of the rail 20 mounted to the upper surface 11 of the track segment. According to the illustrated embodiment two pairs of rollers 110 are mounted to the lower side of the first segment 103 with a first pair located along a first edge of the track portion 24 of the rail and a second pair located along a second edge of the track portion 24 of the rail 20. The first and second edges and, therefore, the first and second pairs of rollers 110 are on opposite sides of the rail 20 and positively retain the mover 100 to the rail 20. The bottom member 106 extends generally orthogonal to the side member 102 at a bottom end of the side member 102 and extends for a distance sufficient to receive a third pair of rollers 110 along the bottom of the mover 100. The third pair of rollers 110 engage an outer edge of the track portion 24 of the rail 20 mounted to the lower surface 13 of the track segment. Thus, the mover 100 rides along the rails 20 on the rollers 110 mounted to both the top member 104 and the bottom member 106 of each mover 100. The top member 104 also includes a second segment 120 which protrudes from the first segment 103 an additional distance beyond the rail 20 and is configured to hold a position magnet 130. According to the illustrated embodiment, the second segment 120 of the top member 104 includes a first portion 122 extending generally parallel to the rail 20 and tapering to a smaller width than the first segment 103 of the top member 104. The second segment 120 also includes a second portion 124 extending downward from and generally orthogonal to the first portion 122. The second portion 124 extends downward a distance less than the distance to the upper surface 11 of the track segment but of sufficient distance to have the position magnet 130 mounted thereto. According to the illustrated embodiment, a position magnet 130 is mounted within a recess 126 on the second portion 124 and is configured to align with a sensor 150 mounted within the top surface 11 of the track segment.

With reference again to FIG. 7, a second embodiment of an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. A first set of rollers 110 are mounted on the lower side of the top member 104 and are configured to engage either side of the first track portion 26 of the rail 20 mounted to the upper surface 11 of the track segment. According to the illustrated embodiment two pairs of rollers 110 are mounted to the lower side of the top member 104 with a first pair located along a first side of the first track portion 26 and a second pair located along a second side of the first track portion 26 of the upper rail 20. A third pair of rollers 110 are mounted on the side member 102 and extend below the second track portion 28 of the upper rail. The bottom member 10$ extends generally orthogonal to the side member 102 at a bottom end of the side member 102 and extends for a distance sufficient to receive a fourth and fifth pair of rollers 110 along the bottom of the mover 100. The fourth and fifth pair of rollers 110 each engage one side of the first track portion 26 of the lower rail 20. A sixth pair of rollers 110 are mounted on the side member 102 and extend above the second track portion 28 of the lower rail. The rollers 110 act together to engage the various surfaces of the rails 20 to both allow the mover 100 to travel along the rails 20 and to maintain the orientation of the mover 100 with respect to the track 10. According to the illustrated embodiment, a position magnet 130 is mounted within the top member 104 and is configured to align with a sensor 150 mounted within the top surface 11 of the track segment.

With reference to both FIGS. 5 and 7, a linear drive system is incorporated in part on each mover 100 and in part within each track segment 12, 14 to control motion of each mover 100 along the segment. Coils 50 (see also FIG. 8) mounted along the length of the track 10 serve as first drive members. Each mover 100 includes a second drive member 140 which is configured to interact with electromagnetic fields generated by the coils 50 to propel the mover 100 along the track 10. It is contemplated that the drive members 140 on each mover 100 may be drive magnets, steel back iron and teeth, conductors, or any other suitable member that will interact with the electromagnetic fields generated by the coils 50. Commonly, the drive member 140 on each mover 100 includes permanent magnets which emit a magnetic field. The magnetic field generated by the drive member 140 on each mover 100 improves the mover interaction with the electromagnetic field generated by the coils 50 in comparison to a magnetically salient structure that has no magnetic field. For convenience, the invention will be discussed with respect to drive magnets 140 being used as the drive member within each mover 100. However, it is understood that the other magnetically salient structures may be employed without deviating from the scope of the invention.

Figure 8:
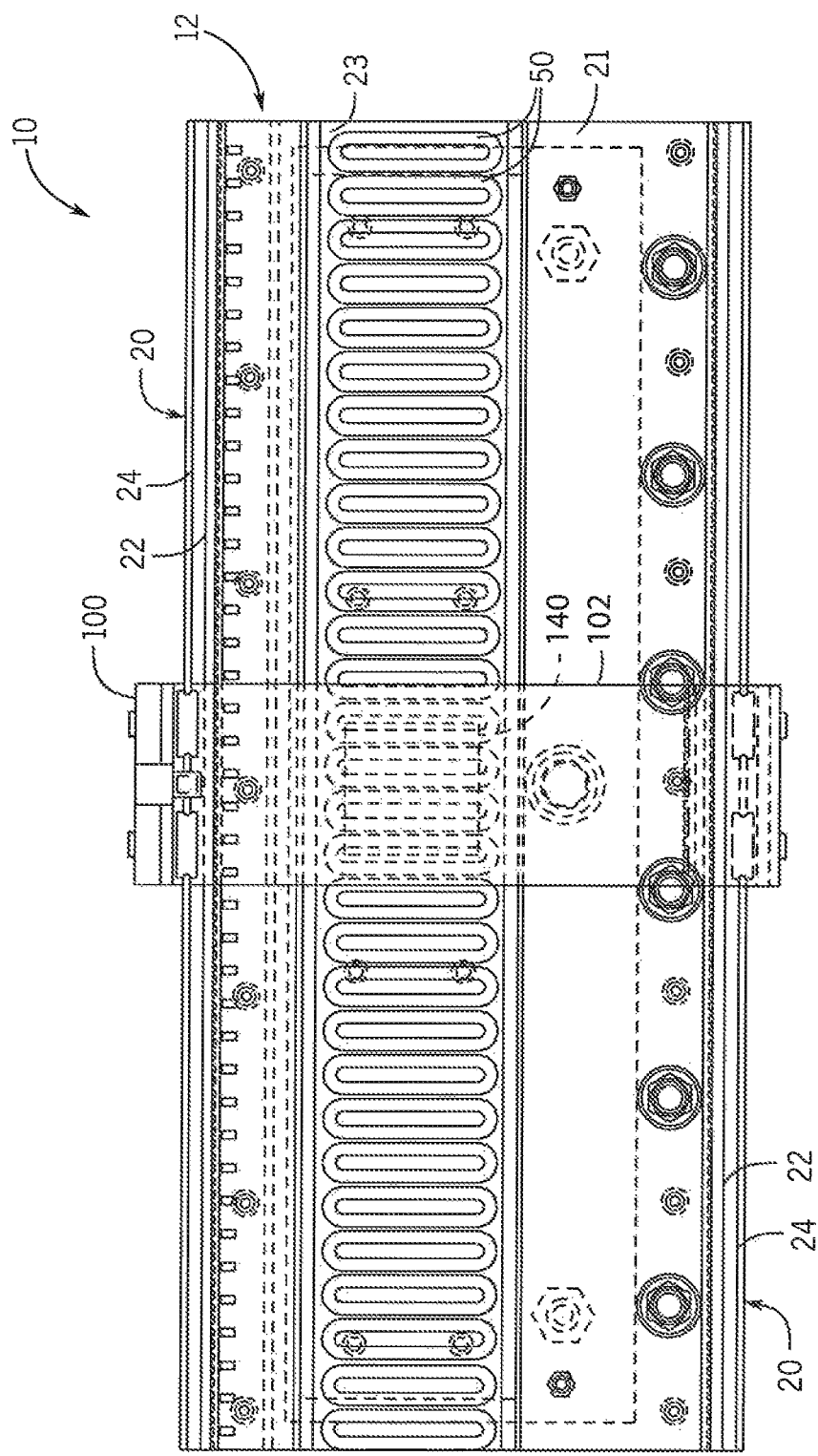
FIG. 8 is a partial side elevation view of one segment of one embodiment of the linear cart system of FIG. 1 illustrating activation coils distributed along one surface of the track segment.

With reference to FIG. 8, a series of coils 50 are positioned along the length of the track 10. Each mover 100 includes at least one drive magnet 140 configured to interact with an electromagnetic field generated in the coils. Successive activation of the coils 50 establishes a moving electromagnetic field that interacts with the magnetic field generated by each permanent magnet 140 mounted on the movers 100 and that causes the mover 100 to travel along the track 10. Controlled voltages are applied to each coil 50 to achieve desired operation of the movers. The drive magnets 140 are mounted on the inner surface of the side member 102 and when mounted to the track 10 are spaced apart from a series of coils 50 extending along the track 10. As shown in FIGS. 5 and 7, an air gap 141 is provided between each set of drive magnets 140 and the coils 50 along the track 10. According to the illustrated embodiment, each coil 50 is placed in a channel 23 extending longitudinally along one surface of the trach segment 12. The electromagnetic field generated by each coil 50 spans the air gap 141 and interacts with the drive magnets 140 mounted to the mover 100 to control operation of the mover 100.

Figure 9:
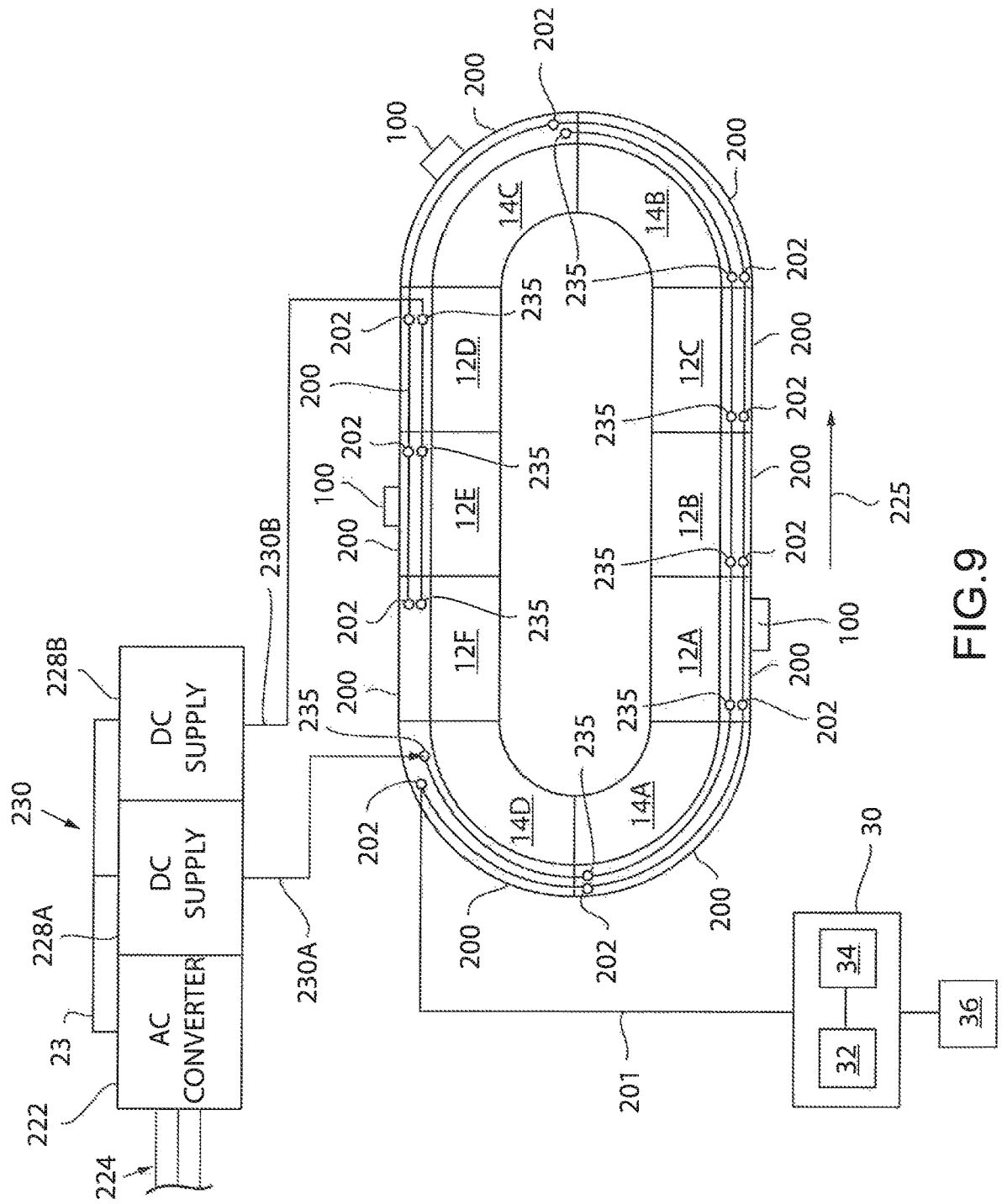
FIG. 9 is a block diagram representation of an exemplary power and control system for the transport system of FIGS. 1 and 2.

Turning next to FIG. 9, an exemplary power and control system for the track 10 and linear drive system is illustrated. A segment controller 200 is mounted within each track segment 12, 14. The segment controller 200 receives command signals from a system controller 30 and generates switching signals for power segments 210 (FIG. 10) which, in turn, control activation of each coil 50. Activation of the coils 50 are controlled to drive and position each of the movers 100 along the track segment 12 according to the command signals received from the system controller 30.

The illustrated motion control system includes a system controller 30 having a processor 32 and a memory device 34. It is contemplated that the processor 32 and memory device 34 may each be a single electronic device or formed from multiple devices. The processor 32 may be a microprocessor. Optionally, the processor 32 and/or the memory device 34 may be integrated on a field programmable array (FPGA) or an application specific integrated circuit (ASIC). The memory device 34 may include volatile memory, non-volatile memory, or a combination thereof. The system controller 30 could be a Programmable Logic Controller (PLC). A user interface 36 is provided for an operator to configure the system controller 30 and to load or configure desired motion profiles for the movers 100 on the system controller 30. It is contemplated that the system controller 30 and user interface 36 may be a single device, such as a laptop, notebook, tablet or other mobile computing device. Optionally, the user interface 36 may include one or more separate devices such as a keyboard, mouse, display, touch-screen, interface port, removable storage medium or medium reader and the like for receiving information from and displaying information to a user. Optionally, the system controller 30 and user interface 36 may be integrated into an industrial computer mounted within a control cabinet and configured to withstand harsh operating environments. It is contemplated that still other combinations of computing devices and peripherals as would be understood in the art may be utilized or incorporated into the system controller 30 and user interface 36 without deviating from the scope of the invention.

One or more programs may be stored in the memory device 34 for execution by the processor 32. The system controller 30 receives one or more motion profiles for the movers 100 to follow along the track 10. A program executing on the processor 32 is in communication with a segment controller 200 on each track segment 12 via a control network 201, such as an EtherNet/IP network. The system controller 30 may transfer a desired motion profile to each segment controller 200 or, optionally, the system controller 30 may perform some initial processing based on the motion profile to transmit a segment of the motion profile to each segment controller 200 according to the portion of the motion profile to be executed along that segment. Optionally, the system controller 30 may perform still further processing on the motion profile and generate a desired switching sequence for each segment 12 that may be transmitted to the segment controller 200.

A gateway 202 in each segment controller 200 receives the communications from the system controller 30 and passes the communication to a processor executing in the segment controller 200. According to the embodiment illustrated in FIG. 9, the industrial network 201 is configured in a daisy chain configuration. The system controller 30 is connected to the gateway 202 in one segment 14D and the gateways 202 in each of the other segments are serially connected via connectors between segments. Optionally, the industrial network 201 may be configured in a star topology, where the system controller 30 is connected directly to the gateway 202 in each segment controller 200. According to still other embodiments, the industrial network 201 may be configured in a combination of serial or parallel configurations according to the application requirements. The processor may be a microprocessor. Optionally, the processor and/or a memory device within the segment controller 200 may be integrated on a field programmable array (FPGA) or an application specific integrated circuit (ASIC). It is contemplated that the processor and memory device may each be a single electronic device or formed from multiple devices. The memory device may include volatile memory, non-volatile memory, or a combination thereof. The segment controller 200 receives the motion profile, or portion thereof, or the switching sequence transmitted from the system controller 30 and utilizes the motion profile or switching sequence to control movers 100 present along the track segment 12 controlled by that system controller 30.

According to the illustrated embodiment, an AC converter 222 can receive a single or multi-phase AC voltage 224 from a power grid. The AC converter 222, in turn, converts the AC voltage to a DC voltage using an active or passive rectifier front end. The DC voltage may be passed between the AC converter 222 and one or more DC power supplies 228 via DC bus bars 231, defining, at least in part a DC bus 230 for the power system. The DC supply 228, in turn, can provide a distributed DC bus 230 from the power supply 228 to input terminals of the track segments 12. The DC supply 228 may be configured to regulate the DC voltage at generally the same voltage level provided from the AC converter 222. Alternately, the DC supply 228 may be configured as either a buck or boost converter to lower or raise the voltage level from that provided by the AC converter 222. According to yet another embodiment of the invention, the DC supply 228 may be configured as a buck-boost converter that is able to selectively regulate the DC voltage at the current level, raise the voltage level, or lower the voltage level.

The DC bus 230 is then provided from the DC supply 228 to each track segment 12, 14. According to the illustrated embodiment, a first DC supply 228A provides a first voltage on a first DC bus 230A to a DC bus connection 235 on one of the curved track segments 14D. Each DC bus connection 235 may be configured to either receive a DC voltage externally from a DC supply 228 or via an internal connection between adjacent track segments 12, 14. The first DC bus 230A is connected between each of the curved track segments 14 and to three of the straight track segments 12A, 12B, and 12C. A second DC supply 228B provides a second voltage on a second DC bus 230B to one of the straight track segments 12D. The remaining straight track segments 12E and 12F each receive the voltage on the second. DC bus 230B via internal connections between the adjacent segments.

Figure 10:
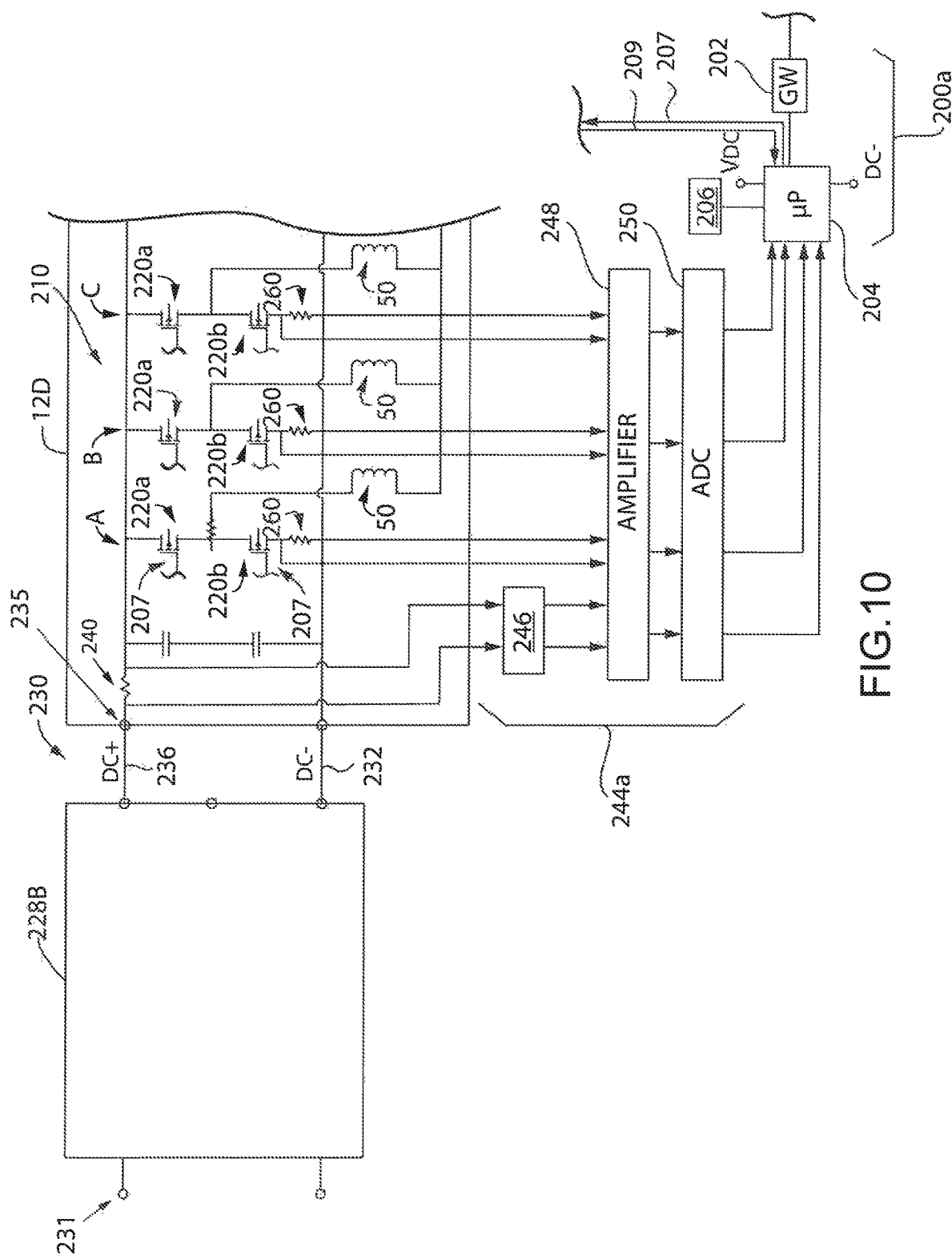
FIG. 10 is an exemplary schematic for a portion of the power and control system of FIG. 9.

Turning next to FIG. 10, a connection between one DC supply 228 and a track segment is illustrated. For illustration purposes, the connection between the second DC supply 228B and the straight track segment 12D from FIG. 9 is referenced. A similar connection would exist between the first DC supply 228A and the curved track segment 14D. Still additional connections may be made if more than two power supplies 228 and/or more than two DC bus voltages are desired. The DC bus 230 is illustrated as a positive rail 236 (DC+) and a negative rail 232 (DC−). The DC bus 230 is configured to carry a DC voltage between the positive and negative rails. It is contemplated that the polarities and magnitudes of the various rails of the DC bus 230 may vary within the scope of the invention.

With additional reference to FIG. 10, each segment controller 200 generates switching signals 207 to control operation of switching devices 220 within one or more power segments 210 mounted within the track segment 12, 14. The switching devices 220 within each power segment 210 are connected between either the positive rail 236 or the negative rail 232 and one of the coils 50. The switching signals 207 are generated to sequentially energize coils 50 along a track segment, where the energized coils 50 create an electromagnetic field that interacts with a magnetic field generated by the drive magnets 140 on each mover 100 to control motion of the movers 100 along the corresponding track segment 12, 14. The switching signals 207 control operation of switching devices 220 in communication with the drive coils 50, including upper switch devices 220a and lower switching devices 220b. The switching devices 220 may be solid-state devices that are activated by the switching signals 207, including, but not limited to, transistors, such as insulated-gate bipolar transistors, thyristors, or silicon-controlled rectifiers.

The processor 204 in each track segment 12, 14 receives a feedback signal 209 from the position sensors 150 along the track segment to provide an indication of the presence of one or more movers 100. In each power segment 210, the processor 204 can generate the switching signals 207 to control the various switching devices 220 to provide power to respective coils 50 for propelling a mover 100 while continuously receiving feedback signals for determining positions of the mover 100. For example, in a first leg "A," the processor 204 can drive the upper and lower switching devices 220a and 220b, respectively, to control a corresponding coil 50 in the first leg A to propel the mover 100. The processor 204 can detect movement of the mover 100 from the first leg A toward an area corresponding to the second leg "B" via the feedback signals from the position sensors 150. The processor 204 can then drive the upper and lower switching devices 220a and 220b, respectively, to control a corresponding coil 50 in the second leg B to continue propelling the mover 100, according to a predetermined motion profile. In each leg, the lower switching devices 220b can be coupled to the DC-voltage rail 232, the upper switching device 220a can be coupled to the full-bus DC voltage rail 236, and the coil 50 can be coupled between the upper and lower switching devices 220a and 220b. Accordingly, the switching devices 220 in each leg can be configured to connect a coil 50 in the leg between rails of the DC bus 230 in various states, such as the upper switching devices 220a connecting or disconnecting full-bus DC voltage rail 236 to a coil 50 causing positive current flow in coil 50, and/or the lower switching device 220b connecting or disconnecting DC-voltage rail 232 to a coil 50 causing negative current flow in coil 50. Additionally, the processor 204 may be configured to generate switching signals 207 for multiple legs (e.g., legs A and B) in tandem if the mover 100 spans multiple coils 50.

The processor 204 receives feedback signals from voltage and/or current sensors mounted at an input or an output of the power segment 210 providing an indication of the current operating conditions of the DC bus 230 within the power segment 210 or the current operating conditions of a coil 50 connected to the power segment 210, respectively. According to the illustrated embodiment, sensing resistors 260 are shown between lower switching devices 220b and the DC-reference voltage rail 232 to detect current through the lower switching devices. Signals from either side of the sensing resistors are provided to the signal conditioning circuitry 244. Similarly, a bus sensing resistor 240 is shown in series with the positive DC bus rail 236. Signals from either side of the bus sensing resistor 240 are provided to the signal condition circuitry 244 through an isolation circuit 246. The signals are provided via an amplifier 248 and an Analog-to-Digital Converter (ADC) 250 to the processor 204 to provide a measurement of the current flowing through each of the sensing resistors 260 and the bus sensing resistor 240. It is contemplated that still other sensing resistors or other current transducers and voltage transducers may be located at various locations within the power segment 210 to provide current and/or voltage feedback signals to the processor 204 corresponding to current and/or voltage levels present on any leg of the DC bus 230 or at the output to any of the coils 50 connected to the power segment 210.

In operation, each segment controller 200 receives a reference signal, such as a motion profile, a voltage reference, or a series of switching signals corresponding to desired operation of the mover 100 present on the corresponding track segment 12, 14. The segment controller 200 regulates the voltage output to the coils 50 to sequentially energize coils 50 along the track segment, where the energized coils 50 create an electromagnetic field that interacts with the drive magnets 140 on the mover to drive the mover 100 along the track 10. The segment controller 200 may utilize a modulation technique, such as pulse width modulation (PWM) to generate a voltage waveform for each coil 50 having a varying amplitude and varying frequency to achieve desired operation of the mover.

With reference again to the exemplary system discussed above, a first portion of a track 10 for an independent cart system is configured to have movers 100 travel at a high rate of speed, and a second portion of the track 10 is configured to have movers 100 travel at a lower rate of speed. The modulation technique used by each segment controller 200 may supply an AC voltage to the coils 50 with a lower peak amplitude for the second portion of the track than for the first portion of the track and still obtain desired operation of the movers 100 because the desired speed along the second portion of the track is less than the desired speed along the first portion of the track. Consequently, the amplitude of voltage present on the DC bus 230 for the second portion of the track 10 need not be as high as the amplitude of voltage present on the DC bus 230 for the first portion of the track.

With reference to FIG. 9, it will be assumed that the movers 100 travel in a counter-clockwise direction around the oval, as indicated by arrow 225. The first portion of the track 10 begins at a first curved track segment 14D and extends around the first curve, the lower straight section of the track, and through the second curve to a second curved track segment 14C. A first power supply 228A provides a DC voltage at a first amplitude to a DC bus connection 235 on the first curved track segment 14D. Each adjacent track segment 12, 14 along the first portion of the track 10 includes connectors by which the DC voltage supplied to the first curved track segment 1413 may be supplied to each adjacent track segment. A first DC bus 230A is defined between the first power supply 228A, the first curved track segment 14D and through each adjacent track segment 12, 14 to the second curved track segment 14C. The second portion of the track 10 begins at a first straight track segment 12D and extends along the upper straight section of the track to a second straight track segment 121. A second power supply 228B provides a DC voltage at a second amplitude to a DC bus connection 235 on the first straight track segment 12D. Each adjacent track segment 12 along the second portion of the track 10 includes connectors by which the DC voltage supplied to the first straight track segment 12D may be supplied to each adjacent track segment. A second DC bus 230B is defined between the second power supply 228B, the first straight track segment 12D and through each adjacent track segment 12 to the second straight track segment 12F.

It is contemplated that the amplitude of DC bus voltage supplied by the first power supply may be, for example, four hundred volts DC (400 VDC) and the amplitude of the DC bus voltage supplied by the second power supply may be, for example three hundred volts DC (300 VDC). Optionally, the amplitude of the DC bus voltage for the first power supply may be up to six hundred volts DC (600 VDC). According to still another aspect of the invention, it is contemplated that one or both of the DC supplies 228B may be configured to supply a variable amplitude of DC voltage. The maximum amplitude of voltage provided by one or both DC supplies 228 may be up to the six hundred volts DC and the minimum amplitude of voltage provided by either DC supply 228 may be, for example, one hundred volts DC (100 VDC) or any minimum value that is still sufficient to drive the mover 100 according to a desired motion profile along the portion of the track 10 to which the DC voltage is being supplied.

It is contemplated that there are a number of reasons why the amplitude of DC voltage provided to a portion of a track 10 may vary. According to one aspect of the invention, the track may be configured to accept movers 100 having different physical size. A first mover 100 may be smaller and configured to travel at a higher rate of speed, and a second mover 100 may be larger and configured to travel at a lower rate of speed. One independent cart system may include both movers on the track and each mover may have a unique identifier. Either the central controller 30 or the segment controller 200 may be configured to read the unique identifier and/or maintain a position of the movers 100 as they travel along the track. If a portion of the track 10 being supplied by one of the power supplies 228 includes movers 100 of just one type, the amplitude of DC voltage may be higher for the smaller mover, allowing travel at the higher rate of speed, and the amplitude of DC voltage may be lower for the larger mover while still allowing travel at the lower rate of speed. If movers 100 of both types are present along the portion of track supplied by one power supply 288, the amplitude of DC voltage may be supplied at the greater amplitude, allowing the necessary AC voltage for either mover 100 to be generated by each power segment 210. Optionally, the DC supply 228 may be configured to dynamically supply a different DC voltage over time as a function of the mover 100 present along a track segment. When the small mover is present, the amplitude of the DC voltage may be greater and when the larger mover is present, the amplitude of the DC voltage may be larger. The central controller 30 may be configured to monitor the location of each mover 100 along the length of the track and dynamically adjust the amplitude DC voltage according to the voltage best suited to drive a particular mover.

According to another aspect of the invention, other application requirements may impact the desired operation of a mover 100. For example, a mover 100 may travel in a loaded or unloaded manner. It may be desirable to restrict the speed of the mover 100 while loaded to limit forces applied to the load and because the combined weight of the mover 100 and the load may exceed the capacity of the linear drive system to propel at full rated speed. Optionally, interaction with a device external to the independent cart system may require a reduced speed of travel for the mover 100. As previously discussed, a package on a mover may get filled with product, receive a label, and/or be sealed as the mover 100 travels past stations along the track. It may be necessary for the mover 100 to travel at a reduced speed to facilitate coordination of motion between the mover and external device or simply to allow sufficient time at a station for the interaction to occur. The desired operation of the mover may vary based on the load present, the product to be filled, the operation to be performed, or the like. The DC supply 228 may be configured to provide a DC bus voltage of sufficient amplitude for the power segment 210 to, in turn, generate an AC voltage for each coil 50 to achieve desired operation of the movers 100 positioned within the portion of the track 10 to which the DC supply 228 is supplying a DC bus 230.

According to still another aspect of the invention, the segment controller 200 may be configured to propel a mover 100 with an increased force when it receives a reduced amplitude of DC bus voltage. The amount of force applied to a mover 100 is proportional to the amplitude of current supplied to a coil 50 and, in turn, the resultant amplitude of the electromagnetic field that interacts with the drive magnets 140 on each mover. One of the limiting factors for the amount of current that may be supplied to each coil 50 by the power segment 210 is the amount of energy lost and, therefore, the amount of heat generated within the power switching devices 220 during conversion of the DC voltage to an AC voltage. The amount of heat generated in the power switching devices is dependent on a number of factors, including switching losses and the amplitude of current conducted through each switching device. When the full DC bus voltage is supplied from the DC supply 228 to a power segment 210, the power segment 210 is limited to the amount of current it may provide. However, when the DC bus voltage supplied from the DC supply 228 is less than the maximum available DC voltage, the magnitude of switching losses is reduced. Consequently, the power segment 210 can accept a greater proportion of heat generation as a result of the current conducted in each switching device 220. The current rating of each power segment 210 may be greater, therefore, when the DC bus voltage is reduced, allowing an increased driving force to be applied to each mover 100 at lower speed when the DC bus voltage is reduced.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:
1. An independent cart system, comprising:
a track including a plurality of track segments, where each of the plurality of track segments comprises:
a plurality of drive coils, wherein each of the plurality of drive coils is configured to generate an electromagnetic field responsive to an AC voltage applied to the drive coil, and
at least one power segment, wherein each power segment is configured to receive a DC voltage as an input and to convert the DC voltage to the AC voltage applied to each of the plurality of drive coils;
a first DC bus connected to a first portion of the plurality of track segments;

a second DC bus connected to a second portion of the plurality of track segments;
a first power supply operative to supply the DC voltage to the first DC bus at a first amplitude;
a second power supply operative to supply the DC voltage to the second DC bus at a second amplitude; and
at least one mover configured to travel along the track, wherein the at least one mover includes a drive member configured to interact with the electromagnetic fields generated by each of the plurality of drive coils to propel the at least one mover along the track, wherein:
the first amplitude of the DC voltage is less than the second amplitude of the DC voltage,
the at least one power segment for each track segment in the first portion of the plurality of track segments is configured to supply current to each of the plurality of drive coils up to a first maximum current, and
the first maximum current is greater than a second maximum current for the at least one power segment for each track segment in the second portion of the plurality of track segments.

2. The independent cart system of claim 1 wherein either the first power supply or the second power supply is operative to supply a variable DC voltage.

3. The independent cart system of claim 2 wherein the variable DC voltage supplied by the first or second power supply is determined as a function of the at least one mover present on the first or second portion of the track, a load present on the at least one mover, a desired speed of operation of the at least one mover, or a desired interaction with at least one device external to the independent cart system.

4. The independent cart system of claim 1 further comprising a controller operative to generate a motion command for the at least one mover.

5. The independent cart system of claim 4 wherein:
the controller generates the motion command to propel the at least one mover along the first portion of the plurality of track segments at a first speed;
the controller generates the motion command to propel the at least one mover along the second portion of the plurality of track segments at a second speed; and
the second speed is different than the first speed.

6. The independent cart system of claim 5 wherein:
the first DC voltage is less than the second DC voltage; and
the first speed is less than the second speed.

7. A method for controlling operation of at least one mover in an independent cart system, the method comprising the steps of:
supplying a first DC voltage to a first portion of a track for the independent cart system with a first power supply, wherein the track includes a plurality of track segments;
converting the first DC voltage to a first AC voltage along the first portion of the track with at least one power segment present on each of the plurality of track segments;
propelling the at least one mover along the first portion of the track via a drive member mounted on the at least one mover, the drive member configured to interact with an electromagnetic filed generated by the first AC voltage;
supplying a second DC voltage to a second portion of the track with a second power supply, wherein an amplitude of the first DC voltage is less than an amplitude of the second DC voltage;
converting the second DC voltage to a second AC voltage along the second portion of the track with at least one power segment present on each of the plurality of track segments; and
propelling the at least one mover along the second portion of the track via the drive member mounted on the at least one mover responsive to the second AC voltage, wherein the at least one power segment for each track segment in the first portion of the plurality of track segments is configured to supply current to each of the first plurality of drive coils up to a first maximum current and the first maximum current is greater than a second maximum current for the at least one power segment for each track segment in the second portion of the plurality of track segments.

8. The method of claim 7 wherein either the first DC voltage or the second DC voltage supplied by the first power supply or the second power supply, respectively, has a variable amplitude.

9. The method of claim 8 wherein the variable amplitude of the DC voltage supplied by the first or second power supply is determined as a function of the at least one mover present on the first or second portion of the track, a load present on the at least one mover, a desired speed of operation of the at least one mover, or a desired interaction with at least one device external to the independent cart system.

10. The method of claim 7 further comprising the step of generating a motion command for the at least one mover with a controller operatively connected to each track segment.

11. The method of claim 10 wherein:
the controller generates the motion command to propel the at least one mover along the first portion of the plurality of track segments at a first speed;
the controller generates the motion command to propel the at least one mover along the second portion of the plurality of track segments at a second speed; and
the second speed is different than the first speed.

12. The method of claim 8 wherein:
the first DC voltage is less than the second DC voltage; and
the first speed is less than the second speed.

13. The method of claim 7 wherein:
the first AC voltage is provided to a first plurality of drive coils, wherein each of the first plurality of drive coils is configured to generate a first electromagnetic field responsive to the first AC voltage, and
the second AC voltage is provided to a second plurality of drive coils, wherein each of the second plurality of drive coils is configured to generate a second electromagnetic field responsive to the second AC voltage.

* * * * *